United States Patent Office 2,987,498
Patented June 6, 1961

2,987,498
HARDENABLE EPOXY RESIN AND PROCESSES FOR PREPARING AND HARDENING SAME
Jan Ide de Jong, Blaricum, Netherlands, assignor to Koninklijke Zwavelzuurfabrieken v/h Ketjen N.V., Amsterdam, Netherlands, a limited liability company
No Drawing. Filed Feb. 4, 1959, Ser. No. 791,025
Claims priority, application Netherlands Feb. 12, 1958
10 Claims. (Cl. 260—43)

It is known that the reaction of epichlorohydrin with phenolic compounds under the influence of alkali lyes leads to the forming of condensates, containing epoxy groups

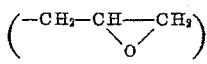

The greater part of such condensates, which are usually called "epoxy resins," is based on reaction products of 2-2'-diphenylolpropane and epichlorohydrin.

Such condensates are characterized by the general formula:

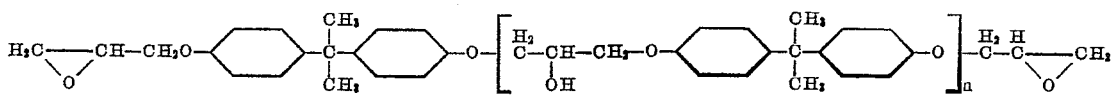

in which $n$ stands for nought or an integer.

These epoxy resins always hold two extreme epoxy groups at different chain length.

Furthermore it is known that these resins, through their chemical resistance and their perfect adhesive properties, are particularly apt for preparing paints, lacquers and varnishes. The basic material price of these condensates, however, is a drawback for many applications.

As a matter of fact, epoxy resins can also be prepared from other polyphenol bases but bisphenol. Thus epoxy resins have been obtained from phenolic condensates or substituted phenols and formaldehyde. Such condensates are generally suitable for preparing laminates; however they are less apt for application in the lacquer-industry. Moreover the difference in basic material price, compared to epoxy resins based on bisphenol A is of little importance as a rule.

The invention concerns a method for the preparation of epoxy resins, which are generally apt for application in the lacquer industry, while at the same time the price of the basic material of these epoxy resins is low. The new epoxy resins are obtained by reacting condensates of technical xylene and formaldehyde first with phenol and then with epichlorohydrin. In this way epoxy resins of greatly varying structure, composition and molecular weight can be obtained, a.o. epoxy resins can be prepared which are apt for application in the lacquer industry.

It has appeared that the properties of the new epoxy resins depend upon the method of preparing the pre-condensate, upon the choice of the phenolic component and upon the proportion of the reacting components.

Already the method for preparing the pre-condensate can be varied in several ways. Thus essentially also other hydrocarbons but xylene, p.e. toluene or naphthalene may be used, though as a rule xylene is preferred because, as is known, the xyleneformaldehyde condensates are particularly reactive, and moreover can be easily obtained in great quantity.

It is of importance for the method according to the invention that the molecular weight of the xylene formaldehyde condensates should be sufficiently high for the medium chain length to contain more than two, preferably more than three xylene kernels, that is to say that it should have a minimum molecular weight of about 300. Preferably a condensate with a molecular weight of more than 400 should be used. Besides, it is desirable that the oxygen content of the precondensates should be more than about 4%, whilst preferably a pre-condensate containing more than about 8–10% oxygen should be used. A high oxygen content of p.e. 13–16%, which is caused by the presence of acetal bridges

etc., in which X= xylene rest) is not necessary, and is undesirable for applications which do not especially require resins with a high epoxy number. In short, preferably a pre-condensate with a relatively high molecular weight (about 500–800), a relatively low oxygen content (about 8–10%) and a small number of acetal groups (about 0.5–3%) is used. The preparation of such condensates is explained in the examples.

As the colour of the pre-condensate has an influence of the colour of the resulting epoxy resin, it is of importance to avoid discolouring during the pre-condensation. This can a.o. be obtained by using as pure a xylene as possible (thus metaxylene gives colourless pre-condensates).

The second step of the process, viz. the reaction of pre-condensates with phenols may be varied by the choice of the phenolic component and by varying the proportion by weight of the reacting components. This is known already from the work of R. Wegler (Angew. Ch. 1948, p. 88).

Thus also paracresol, para-tert.butylphenol, bisphenol A etc., other than phenol, can be brought into reaction with xyleneformaldehyde-condensates.

The ether- and acetal-bridges of the pre-condensates are opened thereby, so that a compound of aralkylphenols is formed while separating off water. For the method according to the invention it is of essential importance that on an average more than one, preferably 2 phenolic groups per molecule of such condensates, are present. For some applications it is desirable to introduce even more than 2 phenolic groups per molecule. By making a suitable choice of the numbers of reacting components, it is possible, to regulate the phenolic groups, as appears from the examples.

When phenol is chosen as a phenolic component, about 0.4–3, preferably about 0.1–1.2 parts of phenol per part of pre-condensate are brought into reaction with each other, under the influence of a very small quantity of a strong acid catalyst, p.e. 0.01% $H_2SO_4$.

In this way condensates, so called novolacquers, are obtained, which contain about 20–70% phenol. The molecular weight of these novolacquers varies from about 300 to about 1500; preferably however, novolacquers with about 35–45% phenol are used, the molecular weight of which being about 500–1000.

Surprisingly it was found, that the epoxy resins, derived from such relatively high molecular novolacquers, are particularly suitable for application in the lacquer industry, as a result of their good flexibility and their surprisingly good adhesive properties.

As is known, the reaction of epichlorohydrin with phenols under the influence of alkaline catalysts can be carried out in several ways, by which various results can be obtained. Thus epoxy resins can be prepared which, apart from terminal epoxy groups, also contain secondary hydroxyl groups. It is also possible to condensate the already formed epoxy resins with novolacquers or with other phenolic compounds under the influence of alkaline catalysts. The way in which the condensation of novolacquers with epichlorohydrin is carried out, is not essential for the invention in question. In general attempts will be made to use as little epichlorohydrin as possible for chainforming of the epoxy resins, in other words, from an economical point of view, efforts will be made of chiefly utilizing the epichlorohydrin for the introduction of ultimate epoxy groups, the further thorough hardening of which depends upon the epoxy resin. As a matter of fact it is necessary for a thorough hardening to introduce more than one epoxy group per molecule, preferably about 2 or more.

From the foregoing it appears that epoxy resins with greatly varying properties and composition can be prepared according to the method of this invention, as will be illustrated in the following examples.

EXAMPLE I-A

*Preparation of a precondensate*

1170 grams formaldehyde of 35% was brought into a roundbottom flask provided with a stirrer and a reflux cooler, and mixed with 638 grams sulphuric acid of 96%. Thereupon 1060 grams of technical xylene were added after which the reaction mixture was heated during 5 hours while stirring and refluxing.

The oily layer was thereupon washed acid free with hot water and thereafter freed from volatile components.

Output _____grams___ 1120
Molecular weight _____ 550
Oxygen content _____percent___ 9.2
Acetal number _____do____ 1.2

EXAMPLE I-B

*Preparation of a novolacquer*

1000 grams of a pre-condensate, obtained according to Example I-A, was thereupon gradually added to 750 grams phenol, which was heated in a roundbottom flask at 145° C.

The reaction was carried out under the influence of 0.4 cm.³ sulfuric acid of 10%. The reaction temperature fell rather quickly to 105° C. as a result of the forming of reaction water. The reaction mixture was heated during 1 hour while refluxing, after which the condensation water (100 grams) and the excess of phenol (220 grams) were distilled off.

Output _____grams___ 1430
Novolacquer, containing 37% bound
  phenol _____do____ 1430
Molecular weight_____About___ 700

EXAMPLE I-C

*Preparation of epoxy resin*

1755 grams of a novolacquer, prepared according to Example I-B, was dissolved in 3000 grams epichlorohydrin, after which 18 cm.³ water was added. After that 287 grams of solid NaOH was added in small quantities in the course of one hour at a temperature of 90° C. After that the reaction was completed by heating for another hour and the excess of epichlorohydrin was distilled off. The thus obtained resin was dissolved in 3 liters of benzene and filtered.

After removing the solvent 2 kg. of a clear, slightly yellow solid resin was obtained.

Molecular weight _____Ca___ 800
Epoxy number _____ 0.25

EXAMPLE II-A 1000 grams of a pre-condensate, prepared according to Example I-A, was brought into reaction with 900 grams of phenol under the influence of 4 cm.⁴ 0.1 N $H_2SO_4$. In this way 1530 grams of a clear brown novolacquer was obtained.

Molecular weight _____About___ 600
Phenol content _____Percent___ 41

EXAMPLE II-B 1500 grams of the novolacquer, prepared according to Example II-A, was dissolved in 920 grams (10 mol.) of epichlorohydrin.

The thus obtained mixture was brought into reaction with 10 cm.³ of water and 265 grams (6.6 M) of NaOH at 95-100° C. After a reaction period of 2 hours the excess of epichlorohydrin (about 300 grams) was distilled off and the epoxyresin was dissolved in 2 l. of benzene. The formed sodium chloride was filtered off and the solvent was distilled off.

The slightly yellow, clear, solid resin which was prepared in this way had an epoxynumber of 0.28 and a molecular weight of about 900.

EXAMPLE III 245 grams of a novolacquer with a molecular weight of 750 and a phenol content of 38% was dissolved in 41 grams of NaOH (1 mol.) and 410 grams of water. Thereupon 140 grams of epichlorohydrin (1.5 mol.) was added at 25° C.

The reaction temperature slowly rose to 55° C. which reaction temperature was maintained for about 2 hours. Thereupon the conversion was completed by reacting for another 2½ hours at 100° C. The excess of epichlorohydrin was distilled off. The resin was dissolved in 225 grams of benzene, filtered and thereafter freed from the solvent.

The thus obtained solid epoxy resin had an epoxy number of 0.16 and a molecular weight of about 1300.

EXAMPLE IV

An epoxy resin, which was prepared according to Exemple III, after removal of the excess of epichlorohydrin, was washed saltfree with water, and thereupon freed from the last traces of water by heating in vacuo. The resin had an epoxy number of 0.17 and a molecular weight of about 1200.

EXAMPLE V 141 grams of a novolacquer was obtained by reacting 70 grams of a pre-condensate of technical xylene and formaldehyde (M.G. 400) with 93 grams of phenol.

This novolacquer, which contained 45% phenol and which had a molecular weight of about 450, was dissolved in 300 grams of epichlorohydrin. The semiliquid epoxy resin, which was obtained after reaction of this mixture with 28 grams of NaOH, had an epoxy number of 0.34 and a medium molecular weight of about 600.

EXAMPLE VI 153 grams of a pre-condensate of technical xylene and formaldehyde (M.G. 500) was brought into reaction with 120 grams of tert.butylphenol under the influence of 0.1 gram of toluenesulfonic acid. After a reaction period of 1 hour at 150° C., 22 grams of water were distilled off and a clear slightly yellow novolacquer was obtained.

This novolacquer was then brought into reaction with 368 grams of epichlorohydrin and 33 grams of NaOH. The thus prepared clear very slightly coloured semi-solid epoxy resin had an epoxy number of 0.20 and a molecular weight of about 650.

EXAMPLE VII 70 grams of a naphthalene-formaldehyde resin (M.G. about 500) was heated during 1½ hour at 140° C. with 70 grams of phenol and 0.1 gram of paratoluene-sulfonic acid, after which the excess of phenol was distilled off. The thus prepared novolacquer (100 grams) contained 38% phenol.

After epoxydising with 300 grams of epichlorohydrin and 16 grams of NaOH, a clear brown solid epoxy resin with an epoxy number of 0.18 and a molecular weight of about 700 was obtained.

EXAMPLE VIII 50 grams of the epoxy resin, prepared according to Example II-B, was dissolved in 25 grams of toluene and 25 grams of methylethylketone.

This solution was mixed with 4 grams of diethylenetriamine, dissolved in 3 grams of toluene and 3 grams of n.butanol.

The potlife of this solution at room temperature was about 24 hours. The thorough hardened films of this resin were hard, clear, flexible and showed an excellent adhesion on metals and glass.

What I claim is:

1. An epoxy resin which is the condensation product of epichlorohydrin and a substance which contains at least 2 aromatic nuclei per molecule and which is the reaction product of a mono-nuclear phenol and an oxygen containing condensation product of an aromatic hydrocarbon and a compound selected from the class consisting of formaldehyde and paraformaldehyde, and which oxygen containing condensation product is free of unreacted phenol, formaldehyde and paraformaldehyde.

2. An epoxy resin as in claim 1; wherein said aromatic hydrocarbon is selected from the class consisting of xylene, naphthalene and toluene.

3. An epoxy resin as in claim 2; wherein said oxygen containing condensation product is the condensate of xylene and formaldehyde having a molecular weight of at least 300.

4. An epoxy resin as in claim 3; wherein said reaction product is the product of reacting from 0.4 to 3 parts, by weight, of phenol with 1 part of said condensation of xylene and formaldehyde.

5. An epoxy resin as in claim 1; wherein the reaction of the phenol with said oxygen containing condensation product is carried out in a manner so as to introduce more than one phenolic hydroxy group per molecule into the condensation product forming the epoxy resin.

6. An epoxy resin as in claim 1; wherein the condensation of epichlorohydrin with said reaction product is carried out in a manner so as to introduce more than one epoxy group per molecule epoxy resin.

7. A resinous mixture capable of hardening at room temperature, consisting essentially of an amine containing at least two reactive hydrogen atoms; and an epoxy resin which is the condensation product of epichlorohydrin and a substance which contains at least 2 aromatic nuclei per molecule and which is the reaction product of a mono-nuclear phenol and an oxygen containing condensation product of an aromatic hydrocarbon and a compound selected from the class consisting of formaldehyde and paraformaldehyde, and which oxygen containing condensation product is free of unreacted phenol, formaldehyde and paraformaldehyde.

8. A process for the production of cured resins comprising mixing an amine containing at least two reactive hydrogen atoms with a hardenable epoxy resin which is the condensation product of epichlorohydrin and a substance which contains at least 2 aromatic nuclei per molecule and which is the reaction product of a mono-nuclear phenol and an oxygen containing condensation product of an aromatic hydrocarbon and a compound selected from the class consisting of formaldehyde and paraformaldehyde, and which oxygen containing condensation product is free of unreacted phenol, formaldehyde and paraformaldehyde.

9. A method of producing a hardenable epoxy resin consisting of condensing a member selected from the group consisting of formaldehyde and paraformaldehyde, with an aromatic hydrocarbon in the proportions of 1 to 5 moles of said member per mole of said aromatic hydrocarbon, so as to produce a condensate with a molecular weight of at least 300 and which is free of unreacted quantities of said member; reacting 1 part by weight of said condensate with 0.4 to 3 parts of a mono-nuclear phenol so as to produce a novolak which contains at least 2 aromatic nuclei per molecule; and condensing epichlorohydrin with said novolak, in the proportions of 1½ to 5 moles of epichlorohydrin per phenolic hydroxy-group in said novolak, in the presence of an alkaline catalyst in the amount of 0.5 to 2 moles of the latter per phenolic hydroxy-group in said novolak.

10. A method as in claim 9; wherein said catalyst is NaOH.

References Cited in the file of this patent

UNITED STATES PATENTS

| | | |
|---|---|---|
| 2,825,712 | Witzel | Mar. 4, 1958 |
| 2,861,971 | Ritter et al. | Nov. 25, 1958 |